(12) United States Patent
Gharibo

(10) Patent No.: US 11,552,530 B1
(45) Date of Patent: Jan. 10, 2023

(54) ORDINARY AND COMPACT CHARGER DEVICE

(71) Applicant: Achour Gharibo, Dumont, NJ (US)

(72) Inventor: Achour Gharibo, Dumont, NJ (US)

( * ) Notice: Subject to any disclaimer, the term of this patent is extended or adjusted under 35 U.S.C. 154(b) by 0 days.

(21) Appl. No.: 17/691,573

(22) Filed: Mar. 10, 2022

(51) Int. Cl.
| | |
|---|---|
| *H02K 7/18* | (2006.01) |
| *H02K 7/02* | (2006.01) |
| *B60R 16/02* | (2006.01) |
| *H02J 7/14* | (2006.01) |

(52) U.S. Cl.
CPC .......... *H02K 7/1823* (2013.01); *B60R 16/02* (2013.01); *H02J 7/1423* (2013.01); *H02K 7/02* (2013.01)

(58) Field of Classification Search
CPC ........ H02K 7/1823; H02K 7/02; B60R 16/02; H02J 7/1423
See application file for complete search history.

(56) References Cited

U.S. PATENT DOCUMENTS

| | | | |
|---|---|---|---|
| 10,190,467 B1* | 1/2019 | Eddy | F01N 1/02 |
| 2008/0284168 A1* | 11/2008 | Arduini | F03D 15/00 |
| | | | 290/43 |
| 2018/0162374 A1* | 6/2018 | Colavincenzo | B60L 7/22 |

* cited by examiner

*Primary Examiner* — Jared Fureman
*Assistant Examiner* — Duc M Pham
(74) *Attorney, Agent, or Firm* — Joshua Kaplan, Esq.; Kaplan Law Practice LLC

(57) ABSTRACT

Disclosed is a system for dramatically increasing the capacity of onboard power source through internal electricity generation. The internal electricity generation is accomplished using a propulsion device connected to a shaft. A shaft contains wire winding on its opposite end that are embedded within a stator winding. Thus, the motion of the propulsion device create the rotation necessary to create current within the stator and enables an onboard power source to be recharged therefrom.

15 Claims, 7 Drawing Sheets

ORDINARY AND COMPACT CHARGER DEVICE

FIELD OF THE INVENTION

The present invention relates to a system and method of energizing mechanical processes and systems requiring a constant flow of electrical current.

BACKGROUND OF THE INVENTION

Today's society has finally woken up to the fact that humanity required alternative solutions of energy generation. Existing energy production methodologies are still focused on converting heat produced during the burning of fossil fuels into electricity through a multi-step process. This energy generation, while proven and reliable, is detrimental to the environment and depends on a finite amount of such fuels available worldwide.

Other energy generation means include hydro power generation, nuclear power generation and solar power generation. However, with the exception of solar, all of the aforementioned solutions require a significant scale to be practical. Furthermore, nuclear power and hydro-power are potentially extremely hazardous to humanity, and involve displacement of population. The main downside however, is that these solutions are large scale static solutions that do not lend themselves to any device that moves and are not possible to recreate in an off-the grid mode for individual users.

SUMMARY OF THE INVENTION

The disclosed system is disclosing a current generating system. The current generating system is comprised of a propulsion mechanism that is connected to a shaft. The shaft is then connected to a set of coils wrapped around a permanent magnet, which rotates within a stator. The current generated within the stator is then channeled to a load, which may be an electrical device requiring electric current, or a set of batteries requiring a charge, or both.

The propulsion mechanism may be a rail cart or a fan permanently tethered to a shaft. The propulsion mechanism is fueled or energized by the energy produced at the stator level, which is then partially sent back to energize the propulsion mechanism. The shaft may contain one or more flywheels to increase inertia of the rotation.

DESCRIPTION OF THE PREFERRED EMBODIMENTS

Figure 1:
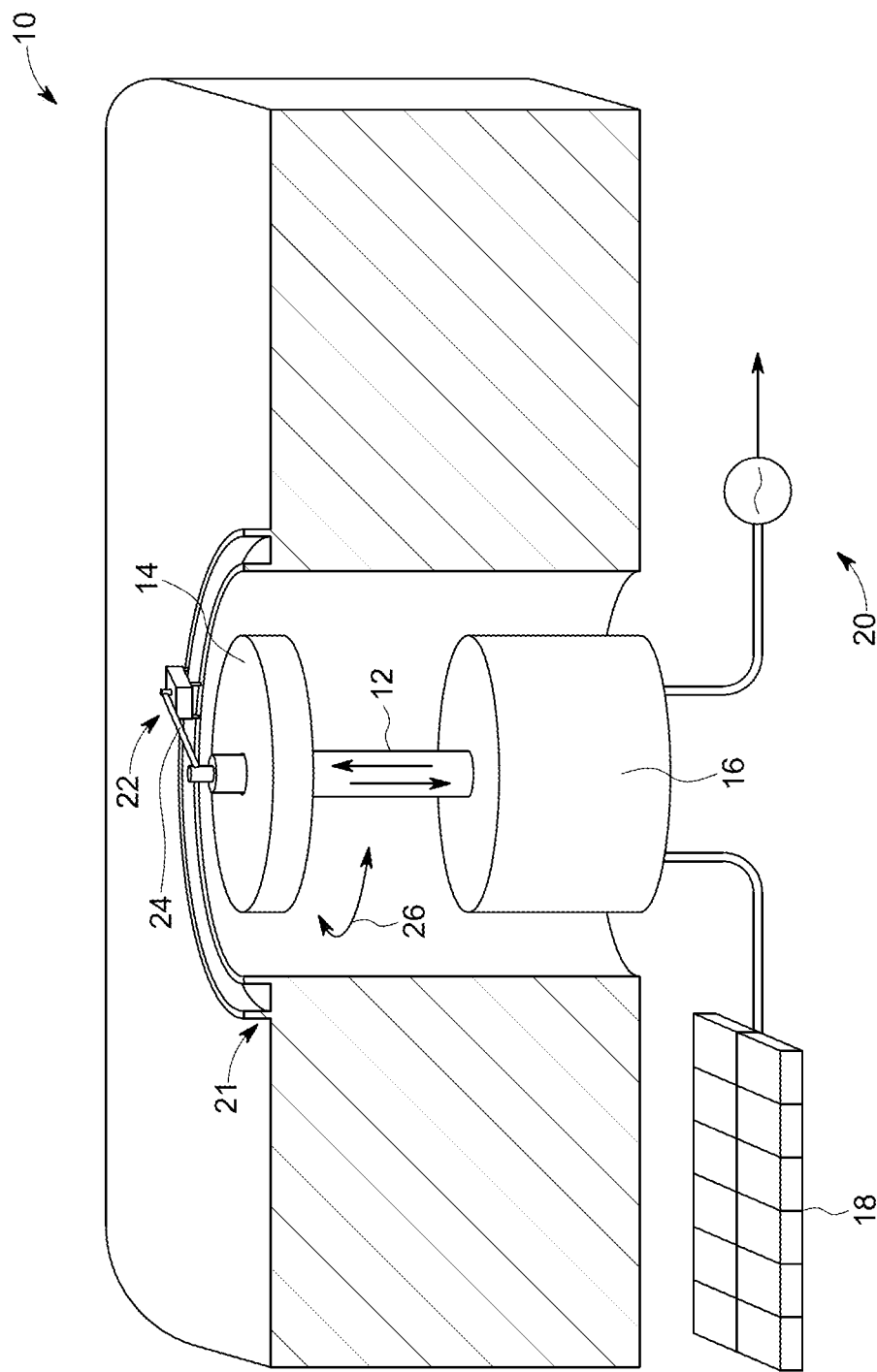
FIG. 1 is an embodiment of the disclosed system where a vehicle produces the necessary torque to turn the disclosed shaft.

The preferred embodiments of the present invention will now be described with reference to the drawings. Identical elements in the various figures are identified with the same reference numerals.

Reference will now be made in detail to embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

It is one of the intentions of the disclosed apparatus to provide a system to supply electric current to mechanical devices.

It is another object of the present invention to provide a flow of electricity to existing circuits to provide alternative or supplemental means of generating electric current.

It is still another object of the present invention to provide a novel electric generator device that is able to scale from very small applications, such as private residences and private vehicles, to large applications, such as trucks, ships, airplanes and power stations.

Figure 2:
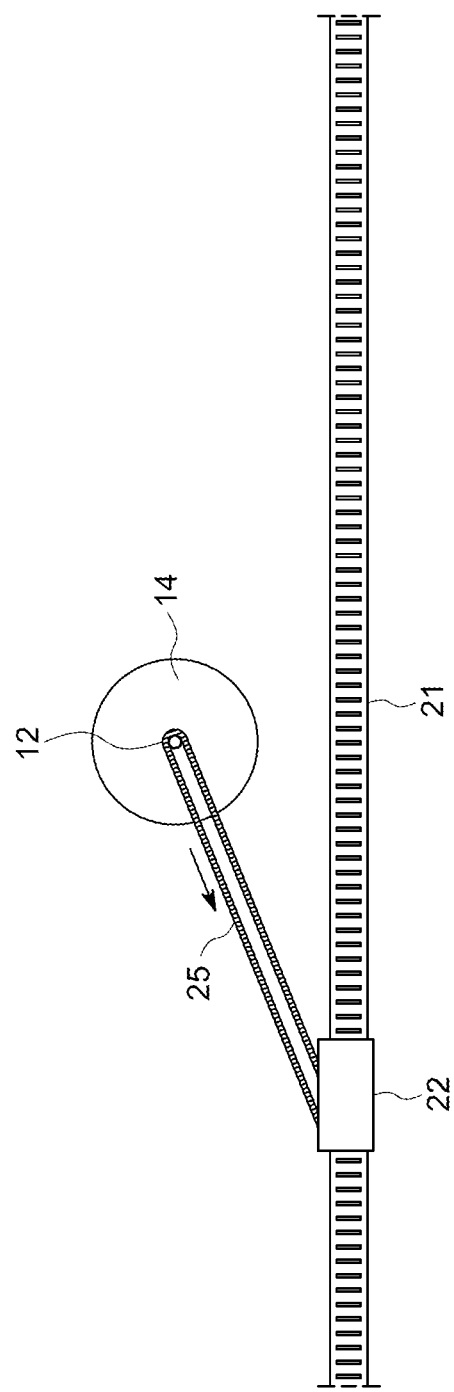
FIG. 2 is the same embodiment as FIG. 1 except the vehicle travels along a straight line rather than a loop around the shaft. This embodiment is more conducive to heat dissipation.

FIG. 1 demonstrates at least one propulsion device, in this case, a vehicle 22 riding on rails 21 in a circular pattern around the shaft 12. Notably the rails 21 may be replaced with any other guide mechanism with the emphasis of reducing friction between wheels of the vehicle 22 and the rails 21. The vehicle 22 is connected to the flywheel 14 of the shaft 12 via an arm 24. The shaft 12 and the arm 24 is capable of feeding electric current back to the vehicle 22 to empower this rotation. In this way, the device is used to generate electricity and its own activity is utilized to empower its own action. An exterior power source 18 serves as a way to compensate for initial starting charge and for energy lost due to friction and heat. The external power source 18 that is a battery can then be recharged by the disclosed system while the current production is sufficient to do so. The external power source 18 may also include an electric grid, a solar panel, an electric windmill or any other known sources of electrical supply. One of the main purposes of the disclosed apparatus FIG. 2 is an alternative to the system disclosed in FIG. 1, except that the vehicle travels along a straight track 21, with the connection provided by a chain like connection 25. This type of setup is better adapted to energy dissipation. The track 21 may be a straight track, where the vehicle 22 travels back and forth, while dragging the chain 25 in one or dual directions. The track 21 may also be a looping track, such as a rounded parallelogram or square or triangle, where the vehicle 25 is tethered to the shaft 12 using a chain or tether arm 24, as shown in FIG. 1.

Figure 3:
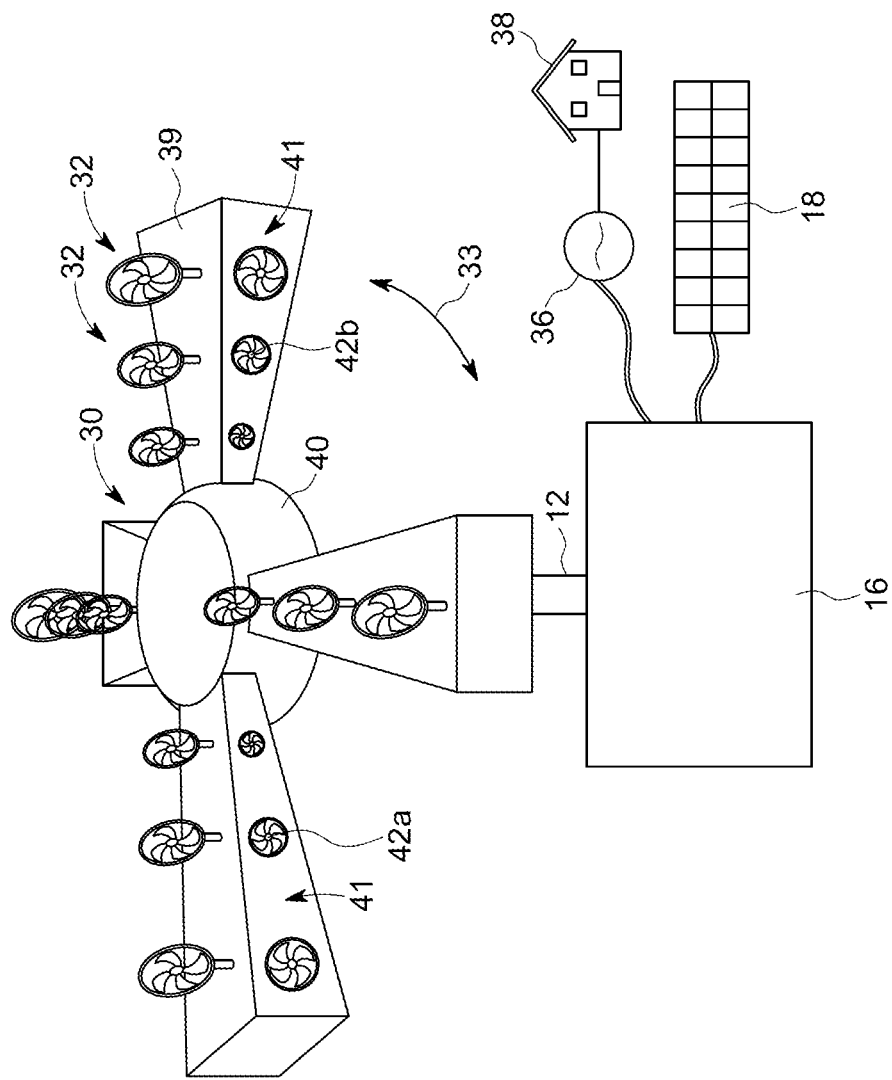
FIG. 3 is a embodiment of energy generation where the torque in the shaft is induced using a plurality of propeller driven motors.

FIG. 3 identifies another propulsion device, in this case, the device is a multi-blade propeller 30 which is turned in the direction 33 by a plurality of additional propellers 32. Each one of the plurality of the propeller devices 32 is disposed on a blade surface 39 of the propeller 30. Additionally, or alternatively, the propellers 32 may be disposed within each blade 39, with intake and exhaust openings 42a, 42b, respectively located within the sidewall 42 of each propeller blade 39. The base 40 of the propeller device is connected to the shaft 12, which terminates within the electric generator 16. The end of the shaft 12 that is embedded with the generator 16 is comprised of wife winding that are designed to generate a current in the stator core of the generator 16. The generator 16 can then power a standby energy storage 18, or be a source of energy for residential electricity needs 38.

Figure 4:
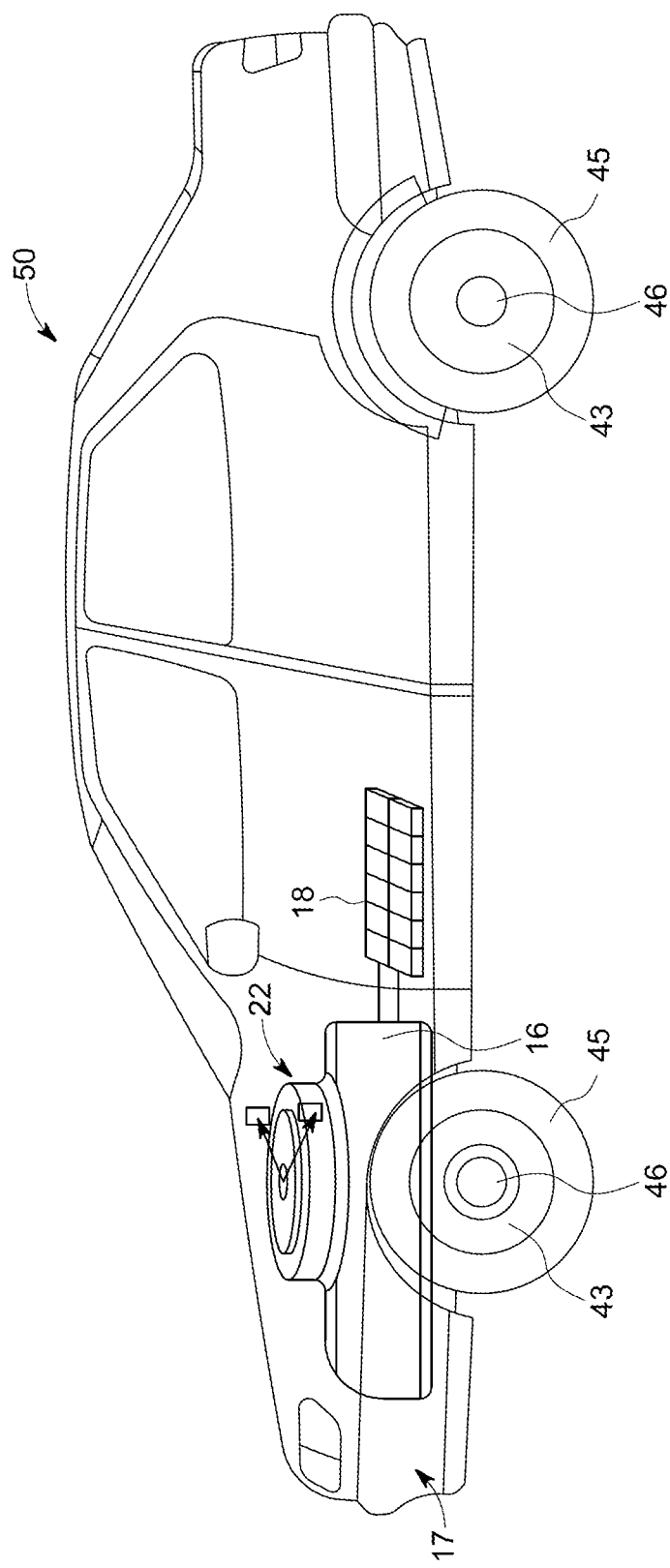
FIG. 4 is contextual figure demonstrating the invention inside an automobile.

FIG. 4 provides another contextual embodiment of the present invention. Shown is an electric vehicle 50 that derives energy from a battery bank 18. The battery bank 18 can be recharged using the motion of the propulsion devices 22 that is connected to the stator 16 within the engine compartment 16. The stator 16 would then be able to substantially prolong intervals when the battery bank 18 would need to be recharged from an external power source. The propulsion device 24 can be connected in line with additional stator devices 43 connected to one or more axles 46. The additional stator devices 43 convert the motion of the wheels 45 into an electrical charge that is used to further energize the battery pack 18. While the axle mounted stator devices 43 may be known in the prior art, their operation and utility are magnified with the addition of the stator device 6. Appreciably, the propulsion device 22 may be adapted to fit any other setting, for example to replace or improve efficiency of turbines deployed on ships or aircraft. A larger embodiment of the propulsion device 22 is shown in FIG. 1 and may be adapted for use at a power station.

Figure 5:
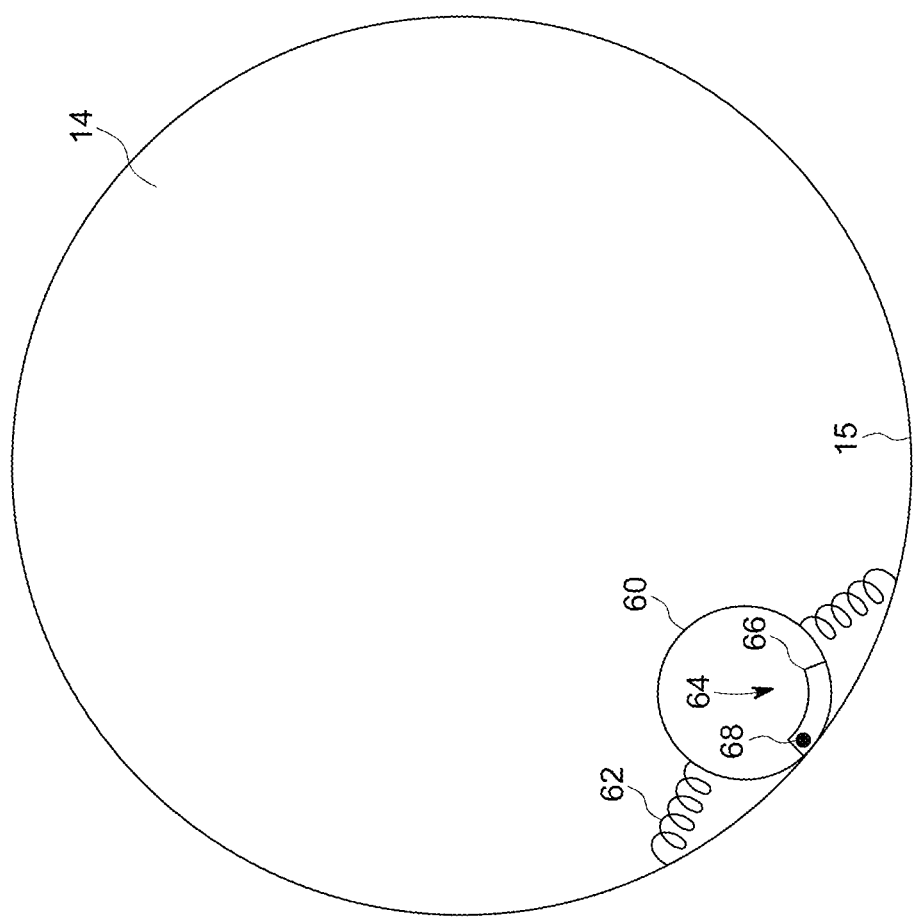
FIG. 5 is another embodiment of the flywheel a rotation assistance device.
Figure 6:
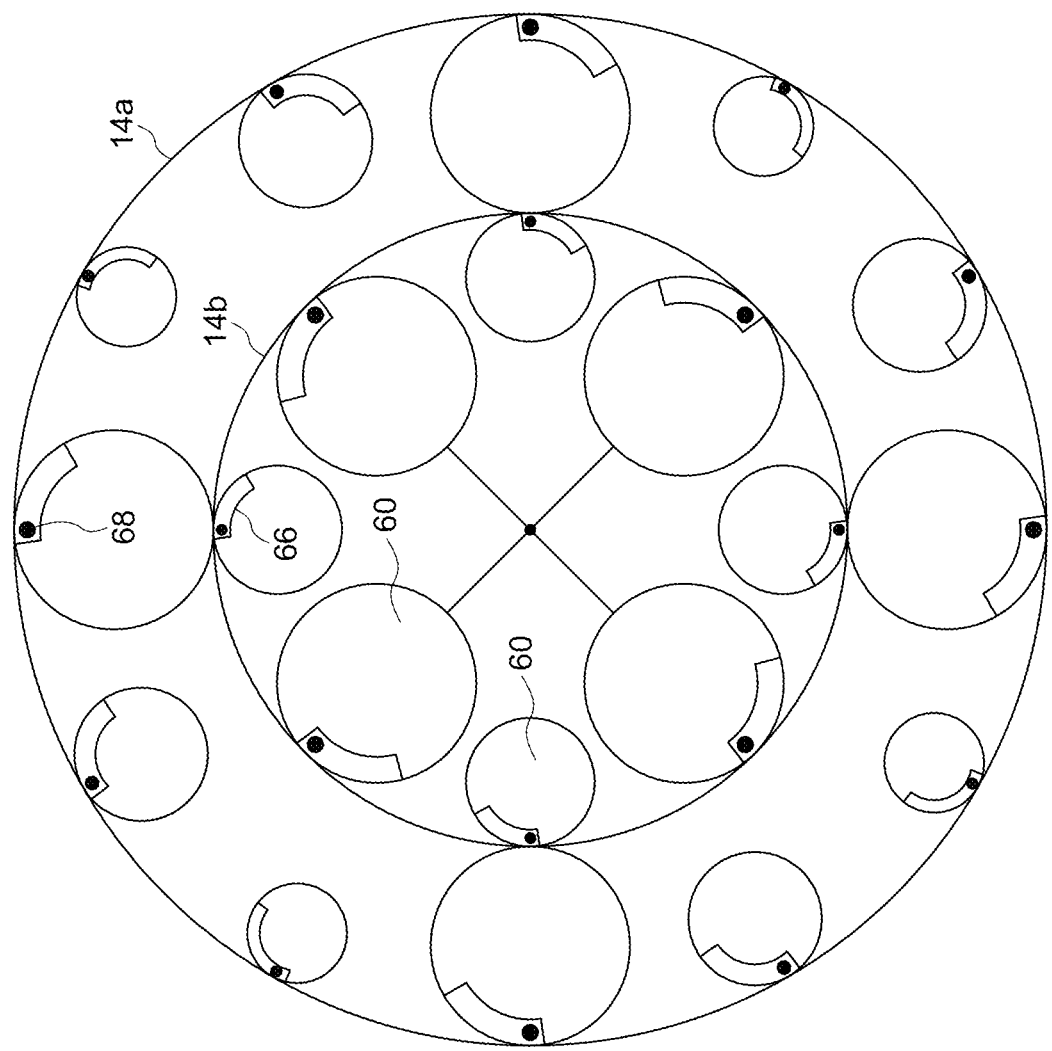
FIG. 6 an additional flywheel embodiment having a plurality of rotational assist devices.

FIG. 5 demonstrates an alternative embodiment of the flywheel 14 having an adaptation that assist with rotation of the flywheel 14. The adaptation is a bearing wheel 60 rotating inside the flywheel 14 and in the same direction as the rotation of the flywheel 14. The bearing wheel is attached to the wall 15 with springs 62. A weighted ball is loosely placed within a channel 66 of the bearing wheel 60.

It should be appreciated that the bearing wheel 60 is placed on the same axis as the axis of rotation of the flywheel 14. Meaning that if the flywheel is parallel to the axis of rotation, meaning it is rotating substantially sideways. Then the bearing wheel 60 is also rotating sideways and is on the same plane as the flywheel 14. On the other hand, if the flywheel 14 is placed perpendicular to the angle of rotation, as shown in FIG. 1 above, then the plane of the bearing wheel 60 will be oriented perpendicular to the plan of the flywheel 14.

Figure 7:
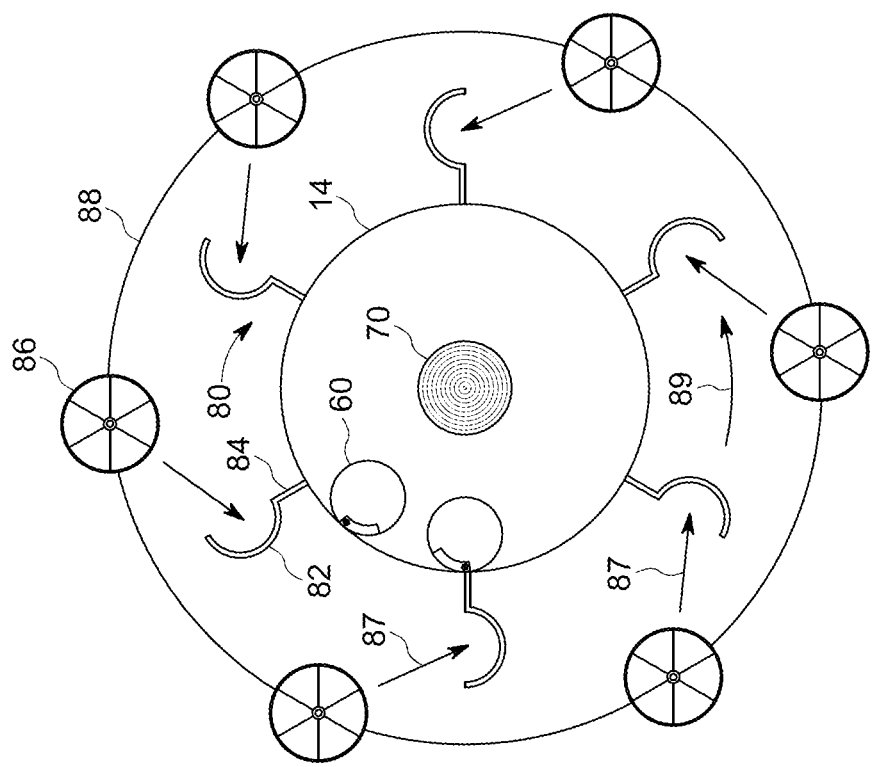
FIG. 7 is yet another embodiment of the flywheel, having a stationery drive mechanism.

FIG. 7 provides a further way to propel a flywheel 14, or shaft 70 into a rotational spin 89. In this embodiment the rotation 89 is accomplished by having fans 86 that are stationary, and connected to a static ring 88, direct a flow of air 87 toward the curved portion 82 of a plurality of blades 80. Each of the plurality of blades 80 is connected via the stem 80 to the flywheel 14, or to the shaft 70, at a spaced apart interval from each other. The static ring 88 may be placed onto the ground, with flywheel rotating horizontally and in parallel with the ground. Alternatively, in an embodiment where rotation is enhanced or assisted with a plurality of bearing wheels 40, the entire assembly shown in FIG. 7 is turned sideways.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed:

1. A system for generating electric current comprising, at least one propulsion element, said at least one propulsion element torsiously connected to a shaft using a connection element; said shaft forming a rotor that rotates within a stator element, wherein said rotor element and said stator element forming components of an electric generator; said electric generator configured to supply electric current to a load; and wherein said electric generator connecting directly to said propulsion element and wherein said electric generator or said load represent the only energy supply energy to propel said propulsion element.

2. The system of claim 1, wherein energy to displace said propulsion element is provided through the connection element.

3. The system of claim 2, further comprising an external power source; wherein said external power source compensating for gradual loss of energy by said electric generator.

4. The system of claim 2, wherein said propulsion element is at least one vehicle connected to said shaft via an arm.

5. The system of claim 2, wherein said propulsion element is a bladed device.

6. The system of claim 2, wherein said propulsion element is a bladed wheel.

7. The system of claim 6, wherein said bladed wheel further comprises a plurality of bladed devices to induce a spin of said bladed wheel.

8. The system of claim 2, wherein said propulsion element is a wheel comprising at least two blades, wherein the surface of said wheel further comparing at least two propellers.

9. The system of claim 1, wherein said electric generator is configured to provide propulsion to a mechanical device, wherein said mechanical device is an automobile.

10. The system of claim 9, further comprising an external power source; wherein said external power source compensating for gradual loss of energy by said electric generator.

11. The system of claim 9, wherein said propulsion element is at least one vehicle connected to said shaft via an arm.

12. The system of claim 9, wherein said propulsion element is a bladed device.

13. The system of claim 9, wherein said propulsion element is a bladed wheel.

14. The system of claim 13, wherein said bladed wheel further comprises a plurality of bladed devices to induce a spin of said bladed wheel.

15. The system of claim 1, further comprising a flywheel, wherein said flywheel mounted perpendicularly to said shaft, said flywheel configured to promote rotation of said shaft by increasing the torsional momentum of said shaft and said flywheel combination.

* * * * *